United States Patent
Buerkin et al.

(10) Patent No.: US 12,516,432 B2
(45) Date of Patent: Jan. 6, 2026

(54) ELECTROLYTIC CELL, METHOD FOR OPERATING A CELL OF THIS TYPE AND ELECTROLYSER

(71) Applicant: THYSSENKRUPP NUCERA AG & CO. KGAA, Dortmund (DE)

(72) Inventors: Cornelia Buerkin, Dortmund (DE); Peter Toros, Essen (DE); Gregor Damian Polcyn, Dortmund (DE); Sebastian Austenfeld, Soest (DE); Stefan Klink, Bochum (DE); Jonas Brinkmann, Bochum (DE)

(73) Assignee: thyssenkrupp nucera AG & Co. KGaA, Dortmund (DE)

( * ) Notice: Subject to any disclaimer, the term of this patent is extended or adjusted under 35 U.S.C. 154(b) by 468 days.

(21) Appl. No.: 17/927,631

(22) PCT Filed: May 25, 2021

(86) PCT No.: PCT/EP2021/063781
§ 371 (c)(1),
(2) Date: Nov. 23, 2022

(87) PCT Pub. No.: WO2021/239674
PCT Pub. Date: Dec. 2, 2021

(65) Prior Publication Data
US 2023/0175149 A1 Jun. 8, 2023

(30) Foreign Application Priority Data
May 26, 2020 (DE) ..................... 10 2020 206 576.4

(51) Int. Cl.
*C25B 15/08* (2006.01)
*C25B 1/04* (2021.01)
(Continued)

(52) U.S. Cl.
CPC ................. *C25B 15/08* (2013.01); *C25B 1/04* (2013.01); *C25B 9/75* (2021.01); *C25B 9/77* (2021.01);
(Continued)

(58) Field of Classification Search
CPC ........................................................ C25B 9/15
See application file for complete search history.

(56) References Cited

U.S. PATENT DOCUMENTS 2,583,799 A * 1/1952 Schloen ................ C01B 19/004
204/263
3,669,857 A * 6/1972 Kirkham ................ C02F 1/4674
210/138
(Continued)

FOREIGN PATENT DOCUMENTS

DE    10 2018 208 624 A1    12/2019
DE    10 2018 222 388 A1    6/2020
(Continued)

OTHER PUBLICATIONS

Mitlitsky et al, Applications and development of high pressure PEM systems, Lawrence Livermore National Laboratory, OSTI ID: 9866, Conference Paper for Portable Fuel Cells Conference, Lucerne, Switzerland, Jun. 1999, pp. 1-16 (Year: 1999).*

(Continued)

*Primary Examiner* — Harry D Wilkins, III
(74) *Attorney, Agent, or Firm* — thyssenkrupp North America LLC

(57) ABSTRACT

An electrolytic cell may include a cathode half-cell having a cathode, an anode half-cell having an anode, and a separator that separates the two half-cells from one another and that is permeable to electrolyte present in the half-cells during operation. At least one inlet for electrolyte is provided in a first half-cell of the two half-cells, and at least one
(Continued)

outlet for electrolyte and no inlet for electrolyte are provided in the second half-cell such that electrolyte supplied via the at least one inlet is dischargeable via the at least one outlet after passing through the separator. A method can also be utilized to operate such an electrolytic cell. And an electrolyzer may include multiple of such electrolytic cells.

11 Claims, 5 Drawing Sheets

(51) Int. Cl.
    *C25B 9/75*     (2021.01)
    *C25B 9/77*     (2021.01)
    *C25B 13/00*     (2006.01)

(52) U.S. Cl.
    CPC ............ *C25B 13/00* (2013.01); *C25B 15/083* (2021.01); *C25B 15/087* (2021.01)

(56) References Cited

U.S. PATENT DOCUMENTS

| | | | | |
|---|---|---|---|---|
| 3,992,271 A * | 11/1976 | Danzig | ................. | H01M 4/928 |
| | | | | 204/293 |
| 4,263,119 A * | 4/1981 | Mose | ....................... | C25B 9/73 |
| | | | | 204/263 |
| 4,285,795 A | 8/1981 | Cook, Jr. | | |
| 4,297,194 A * | 10/1981 | Dotson | ................. | C08J 5/2237 |
| | | | | 204/263 |
| 4,394,244 A * | 7/1983 | Divisek | ................... | C25B 1/04 |
| | | | | 204/295 |
| 5,225,060 A * | 7/1993 | Noaki | ....................... | C25B 9/77 |
| | | | | 204/257 |
| 5,350,496 A * | 9/1994 | Smith | ....................... | C25B 9/23 |
| | | | | 204/266 |
| 5,690,797 A * | 11/1997 | Harada | ..................... | C25B 1/04 |
| | | | | 204/266 |
| 2003/0230495 A1* | 12/2003 | Anderson | ................. | C25B 1/04 |
| | | | | 204/263 |
| 2011/0198232 A1* | 8/2011 | Cipollini | .................. | C25B 9/05 |
| | | | | 204/263 |
| 2011/0266142 A1* | 11/2011 | Norman | .................... | C25B 9/05 |
| | | | | 204/266 |
| 2012/0234676 A1 | 9/2012 | Meneghini et al. | | |
| 2015/0240368 A1 | 8/2015 | Iacopetti et al. | | |
| 2018/0274110 A1 | 9/2018 | Nakano et al. | | |
| 2019/0368059 A1* | 12/2019 | Veening | .................... | C25B 9/15 |
| 2020/0063272 A1 | 2/2020 | Marsh et al. | | |
| 2021/0156036 A1 | 5/2021 | Klink et al. | | |
| 2024/0167175 A1* | 5/2024 | Russ | .................... | C25B 11/031 |

FOREIGN PATENT DOCUMENTS

| | | |
|---|---|---|
| EP | 2 909 363 B1 | 8/2015 |
| FR | 3014452 A1 | 6/2015 |
| GB | 2582049 A | 9/2020 |

OTHER PUBLICATIONS

Botset, The Measurement of Permeability of Porous Alundum Discs for Water and Oils, Review of Scientific Instruments, vol. 2, 1931 (no month available), pp. 84-95 (Year: 1931).*

Cho et al, Alkaline anion exchange membrane water electrolysis: Effects of electrolyte feed method and electrode binder content, Journal of Power Sources, vol. 382, Apr. 2018, pp. 22-29 (Year: 2018).*

Leng et al, Solid-State Water Electrolysis with an Alkaline Membrane, Journal of the American Chemical Society, vol. 134, No. 22, May 2012, pp. 9054-9057 (Year: 2012).*

English Translation of International Search Report issued in PCT/EP2021/063781, dated Aug. 31, 2021.

* cited by examiner

ELECTROLYTIC CELL, METHOD FOR OPERATING A CELL OF THIS TYPE AND ELECTROLYSER

CROSS REFERENCE TO RELATED APPLICATIONS

This application is a U.S. National Stage Entry of International Patent Application Serial Number PCT/EP2021/063781, filed May 25, 2021, which claims priority to German Patent Application No. DE 10 2020 206 576.4, filed May 26, 2020, the entire contents of both of which are incorporated herein by reference.

FIELD

The present disclosure generally relates electrolysis, including electrolytic cells, methods for operating such electrolytic cells, and electrolysers.

BACKGROUND

Classically, electrolyzers have an anolyte circuit and catholyte circuit, with each half-cell having an electrolyte inlet and an electrolyte outlet. Such configurations—which are already known from U.S. Pat. No. 4,285,795 for example—are associated with considerable complexity in terms of providing pipelines, reservoirs, pumps and instruments.

Moreover, undesired stray currents flow via the electrolyte between electrolytic cells which are electrically connected in series and which are connected to one another via mutual electrolyte inlets and outlets. Not only are undesired secondary reactions caused by such stray currents, but the stray currents are also associated especially with a reduction in the efficiency of the electrolysis. Furthermore, it is known that stray currents contribute to undesired corrosion and thus to a reduction in the service life of the electrolytic cells.

A reduction in stray currents can be brought about by reducing the cross-sections of the inlets and outlets for the electrolytes, though this approach can only be pursued to a limited extent because of the need to achieve a minimum electrolyte volumetric flow rate. Alternatively, it is known to reduce the stray currents by increasing the length of the inlets and outlets for the electrolytes. Although this is associated with the advantage of increasing the electrical resistance and thus reducing the stray currents, it is also associated with increasing the space requirements and the costs.

US 2018/0274110 A1 describes a water electrolysis cell having a polymer electrolyte membrane (PEM). The membrane is composed of a hydrocarbon-based electrolyte membrane laminated with a composite membrane comprising a perfluorosulfonic acid-based electrolyte and a superstrong acid metal oxide. The membrane forms a solid electrolyte having improved proton conductivity with, at the same time, low gas permeability and high mechanical strength.

US 2012/0234676 A1 discloses a chlor-alkali electrolysis cell having a permeable diaphragm as a separator between the chambers. Brine is supplied to the anode chamber, and it flows through the pores of the diaphragm and fills the cathode chamber. In the steady state, the brine level in the anode chamber is higher than that in the cathode chamber. Since more brine is supplied than required for chlorine production, a portion thereof flows through the diaphragm into the cathode chamber and is discharged therefrom mixed with caustic soda.

Thus a need exists for an electrolytic cell which makes it possible to reduce the space requirements and the production costs and, at the same time, to reduce the stray currents and thus the operating costs, and allows serial connection of cells.

SUMMARY

In some examples, an electrolytic cell is suitable for carrying out water electrolysis and at least one inlet for electrolyte is provided in a first half-cell of the two half-cells and at least one outlet for electrolyte and no inlet for electrolyte are provided in the second half-cell, so that electrolyte supplied via the at least one inlet is dischargeable via the at least one outlet after passing through the separator.

Furthermore, in some examples, a method may comprise the following steps:
  connecting the at least one electrolyte inlet and the at least one electrolyte outlet to an electrolyte circuit which is closed via the permeable separator, and filling the two half-cells with electrolyte,
  starting an electrolysis process by closing an electrical circuit via the cathode and anode of the electrolytic cell and an external power source,
  discharging, during the electrolysis process, product gas formed in the half-cells,
  applying to the first half-cells, during the electrolysis process, a positive pressure compared to the second half-cell in order to promote the passage of the electrolyte through the separator.

Such an electrolytic cell comprises a cathode half-cell having a cathode and an anode half-cell having an anode. Both half-cells are separated from one another by a separator which is permeable to an electrolyte present in the half-cells during operation and is intended for separation of the gases formed during electrolysis, which gases could lead to an undesired oxyhydrogen explosion during water electrolysis. Said electrolytic cell is distinguished by the fact that at least one inlet for electrolyte—an inlet in the context of the invention is to be understood to mean a supply of unconsumed, i.e., processed, electrolyte—is provided in a first half-cell of the two half-cells and at least one outlet for (consumed) electrolyte and no inlet for electrolyte are provided in the second half-cell. Electrolyte supplied via the at least one inlet is thus dischargeable via the at least one outlet after passing through the separator, Advantageously, not only does this avoid considerable complexity with respect to the peripherals, such as pipelines, reservoirs, pumps and instruments, but it has also been found that, surprisingly, this measure can significantly reduce stray currents. This not only results in higher efficiency and thus economic viability of the particular electrolytic cell, but also increases the service life thereof, since undesired corrosion processes and secondary reactions can be significantly reduced.

The inlet for electrolyte is may be provided in the cathode half-cell and the outlet for electrolyte is provided in the anode half-cell. In water electrolysis, such a configuration has the advantage that the product purity of the hydrogen formed in the cathode half-cell is improved. Owing to the flow of the electrolyte through the separator, product gases dissolved in the electrolyte are entrained to a certain extent. If the electrolyte flow is directed from the cathode half-cell to the anode half-cell, oxygen dissolved in the electrolyte reaches the cathode half-cell through the separator only to a limited extent. Before re-entry into the cathode half-cell, the product gases dissolved in the electrolyte can be removed as part of electrolyte processing.

In preferred embodiments, the separator is hydrophilic. The hydrophilicity of the separator increases the capillary forces, which lead to complete wetting of the separator with electrolyte. Owing to the wetting of the separator with electrolyte, the pores of the separator are also closed in the gas space present above the electrolyte level in the cell, and so no product gases can pass through the separator. At the same time, the hydrophilicity of the separator ensures an increase in the opening pressure of the pores (i.e., the gas pressure at which the pores reopen) and an improved permeability of the separator to electrolyte.

Preferably, the separator has a permeability in the range from 17 to 175 liters of electrolyte per hour per square meter of active separator surface at a pressure difference between the two half-cells of up to 500 mbar. What can be achieved with a flow rate in this range is that an adequate supply of electrolyte to the cell is ensured and, at the same time, the heat of reaction produced can also be dissipated from the cell via the electrolyte.

In a preferred development of the electrolytic cell according to the invention, a gas separator for separating a product gas from the electrolyte is arranged in the first and/or in the second half-cell. Said gas separator is connected to an electrolyte return, by means of which electrolyte which has entered the gas separator is returnable to the respective half-cell. Electrolyte enters the gas separator primarily through the product gases which are formed during electrolysis and which entrain electrolyte as a flow of droplets, which electrolyte can be recovered through a return from the gas separator in which the electrolyte is separated from the product gas generated.

According to a particularly preferred embodiment of the invention, said return runs inside the half-cell or outside the half-cell. Whereas, in the case of a return inside the half-cell, the electrolyte recovered in the gas separator is conducted back to the electrolyte reservoir through a line inside the half-cell, a return outside the half-cell is distinguished by the fact that the electrolyte first exits from the half-cell or the gas separator through a pipeline and is then either coupled to the already existing electrolyte inlet or forms a second electrolyte inlet for the first half-cell. A return inside the half-cell is particularly preferred with regard to reducing space requirements, whereas the return outside the half-cell has the advantage of less influence on the processes within the half-cell, for example the rise of product gas.

The electrolytic cell according to the invention is suitable for carrying out alkaline water electrolysis. In such a configuration, a particular reduction in stray currents was observed, which is particularly advantageous in view of the increasing importance of water electrolysis.

In practical terms, the electrolytic cells according to the invention are combined in an electrolyzer to form a multiplicity of electrolytic cells which are electrically connected in series and hydraulically connected in parallel in an electrolyte circuit, so that an economically relevant quantity of product gases can be generated.

The electrolyzer preferably comprises only one electrolyte circuit for supplying electrolyte to the cathode half-cells and the anode half-cells. Electrolyte is supplied to the anode half-cells through the separator. The electrolyte circuit is thus closed through the separator.

The electrolyzer preferably further comprises means for generating a positive pressure, by means of which a positive pressure is appliable to the cathode half-cells in relation to the anode half-cells. A positive pressure in the cathode half-cell can additionally reduce passage of product gases formed on the anode side through the separator and promote the passage of electrolyte in the opposite direction.

In addition, the invention relates to a method for operating an electrolytic cell according to the invention, comprising the following steps:

connecting the at least one electrolyte inlet and the at least one electrolyte outlet to an electrolyte circuit which is closed via the permeable separator, and filling the two half-cells with electrolyte, starting an electrolysis process by closing an electrical circuit via the cathode and anode of the electrolytic cell and an external power source, discharging, during the electrolysis process, product gas formed in the half-cells, applying to the first half-cells, during the electrolysis process, a positive pressure compared to the second half-cell in order to promote the passage of the electrolyte through the separator.

It has been found to be particularly advantageous if, in one of the half-cells, preferably the cathode half-cell in the case of water electrolysis, a positive pressure prevails relative to the other half-cell. This promotes the passage of the electrolyte through the separator, and so the electrolysis can be carried out at a higher throughput.

In a particularly preferred development of the method according to the invention, the electrolyte which has entered the gas separator(s) is returned to the respective half-cell, thereby making it possible to reduce electrolyte consumption in a not inconsiderable manner.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an electrolytic cell, which in some cases includes a cathode half-cell having a cathode, an anode half-cell having an anode, and a separator that separates the two half-cells from one another and that is permeable to an electrolyte present in the half-cells during operation. The present disclosure further relates to a method for operating such an electrolytic cell and to an electrolyzer comprising a multiplicity of such electrolytic cells.

Figure 1:
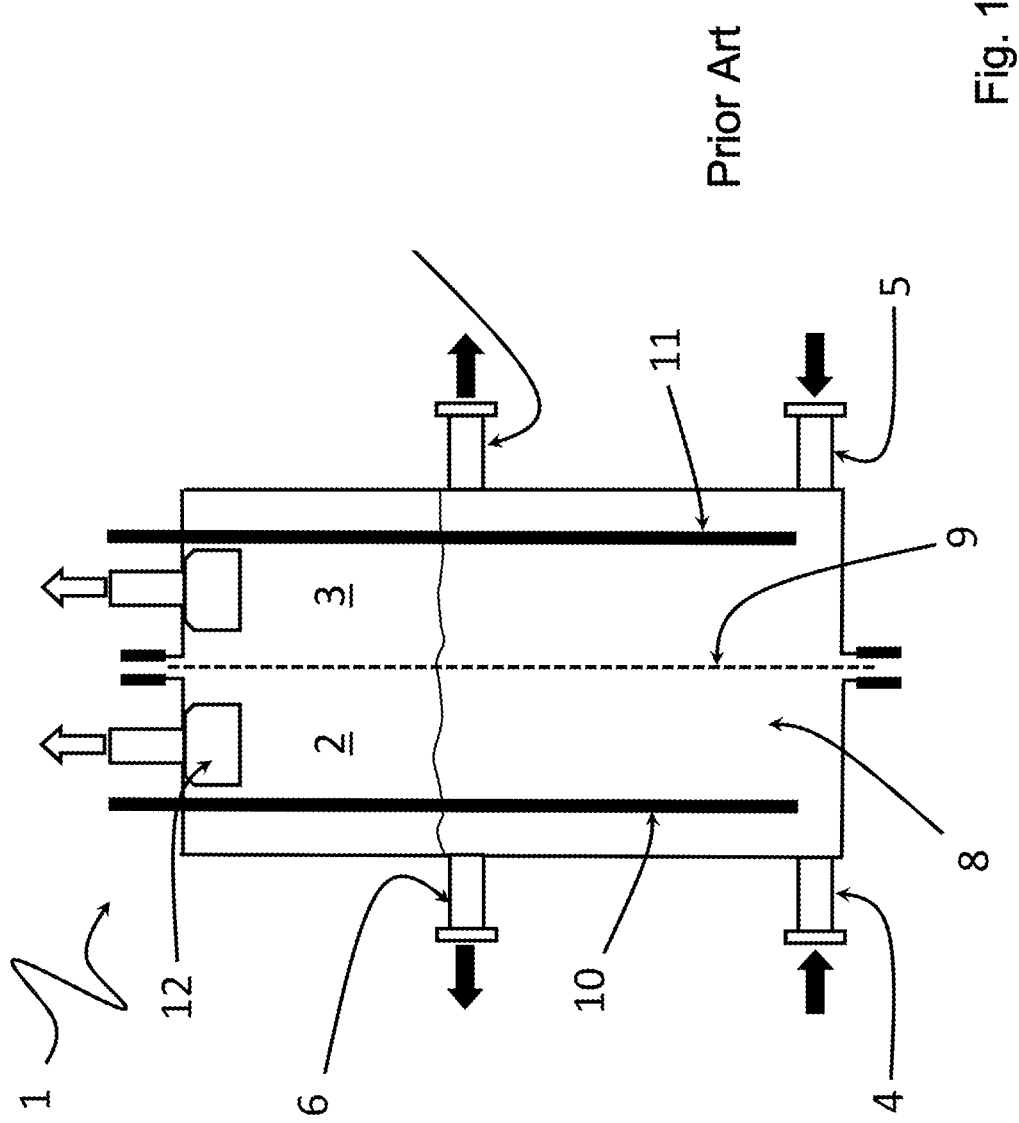
FIG. 1 is a schematic view of a prior art electrolytic cell having an electrolyte inlet and outlet for each half-cell and a permeable separator.

FIG. 1 shows a classic electrolytic cell which has an anolyte circuit and a catholyte circuit, i.e., comprises an inlet and outlet for each half-cell. The permeable separator separates the two half-cells from one another, said separator being permeable to ions in order to close the circuit. During electrolysis, product gases rise and entrain droplets of the electrolyte, the respective electrolytes being separated from the respective product gases in the gas separators.

An electrolytic cell 1 shown in FIG. 1 comprises two electrolyte circuits—one for each half-cell 2, 3—with a total of four pipelines for inlets 4, 5 and outlets 6, 7 for processed or consumed electrolyte 8. This results in a high degree of technical complexity, especially the installation of pipelines. Not only does this drive up the production costs and the complexity of the system, but the multiplicity of pipelines also causes a high degree of stray currents, which lower the efficiency of the electrolytic cell and which moreover lead to undesired corrosion.

Figure 2:
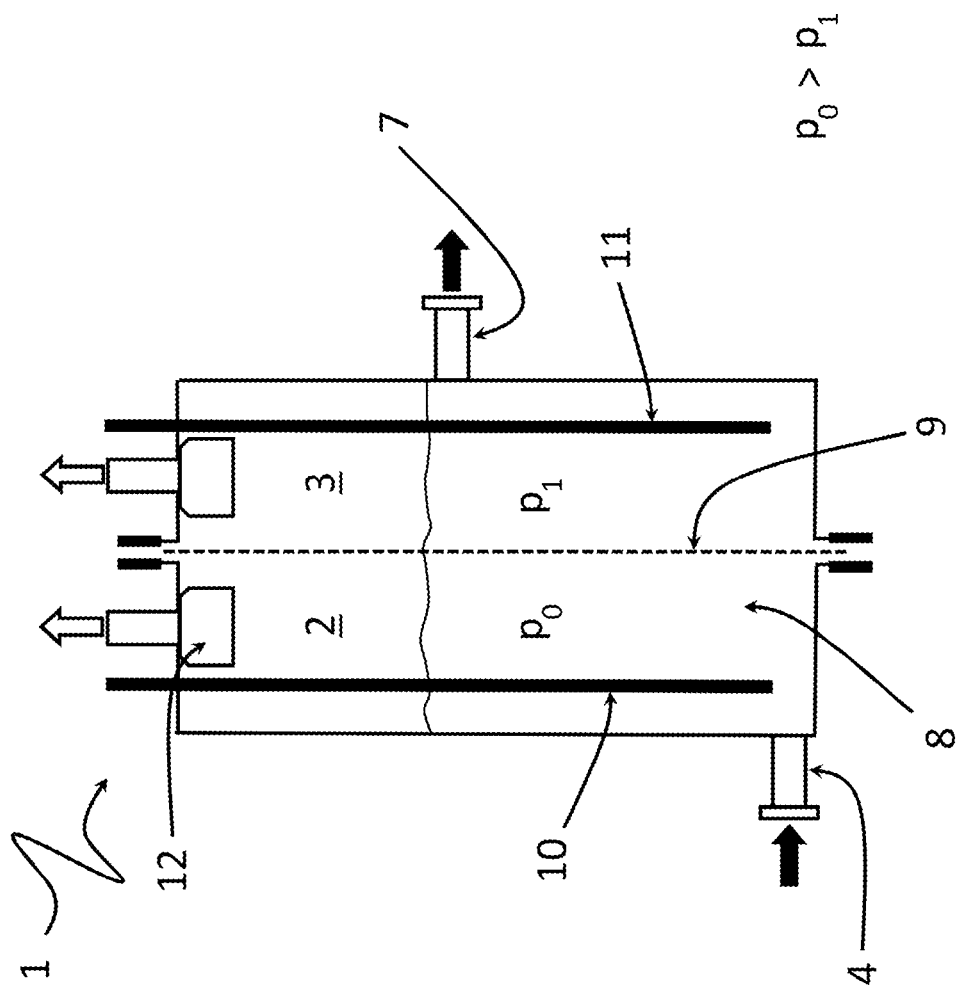
FIG. 2 is a schematic view of an example electrolytic cell having an electrolyte inlet and outlet for each electrolytic cell and a separator permeable to the electrolyte.

A preferred embodiment of the electrolytic cell 1 according to the invention that is depicted in FIG. 2 comprises a separator 9 permeable to electrolyte 8, and also, in the first of the two half-cells 2 besides an electrode 10, an inlet for electrolyte 4 and, in the second half-cell 3 besides an electrode 11, at least one outlet 7 for electrolyte 8 and no inlet for electrolyte 8. This means that electrolyte 8 supplied via the one inlet 4 is dischargeable via the at least one outlet 7 after passing through the separator 9. With regard to the already known electrolytic cell 1, this means that the function of the outlet 6 of one of the half-cells 2 and the function of the inlet 5 of the other half-cell 3 have been taken over by the separator 9 permeable to electrolyte 8. This not only significantly lowers the number of electrolyte circuits or necessary pipelines, but also achieves a reduction in stray currents. This in turn advantageously leads to a reduction in secondary reactions and corrosion.

In the case of the electrolytic cell 1 according to the invention that is depicted in FIG. 2, a positive pressure compared to the second half-cell is applied to the first half-cell 2 during the electrolysis process in order to promote the passage of the electrolyte 8 through the separator 9. This significantly raises the throughput of the electrolytic cell 1 relative to a flow of electrolyte 8 through the separator 9 that is not driven by the pressure conditions in the half-cells 2, 3. Moreover, the separator 9 permeable to electrolyte 8 guarantees separation of the different product gases, which, for example, is necessary in water electrolysis to avoid an oxyhydrogen reaction.

The first half-cell 2 forms the cathode half-cell and the second half-cell 3 forms the anode half-cell, and so the inlet 4 for electrolyte 8 is provided in the cathode half-cell 2 and the outlet 7 for electrolyte 8 is provided in the anode half-cell 3.

The separator 9 is preferably hydrophilic. The separator can, for example, be made of zirconium oxide. The separator 9 preferably has a permeability in the range from 17 to 175 liters of electrolyte 8 per hour per square meter of active separator surface at a pressure difference between the two half-cells 2, 3 of up to 500 mbar.

Figure 3:
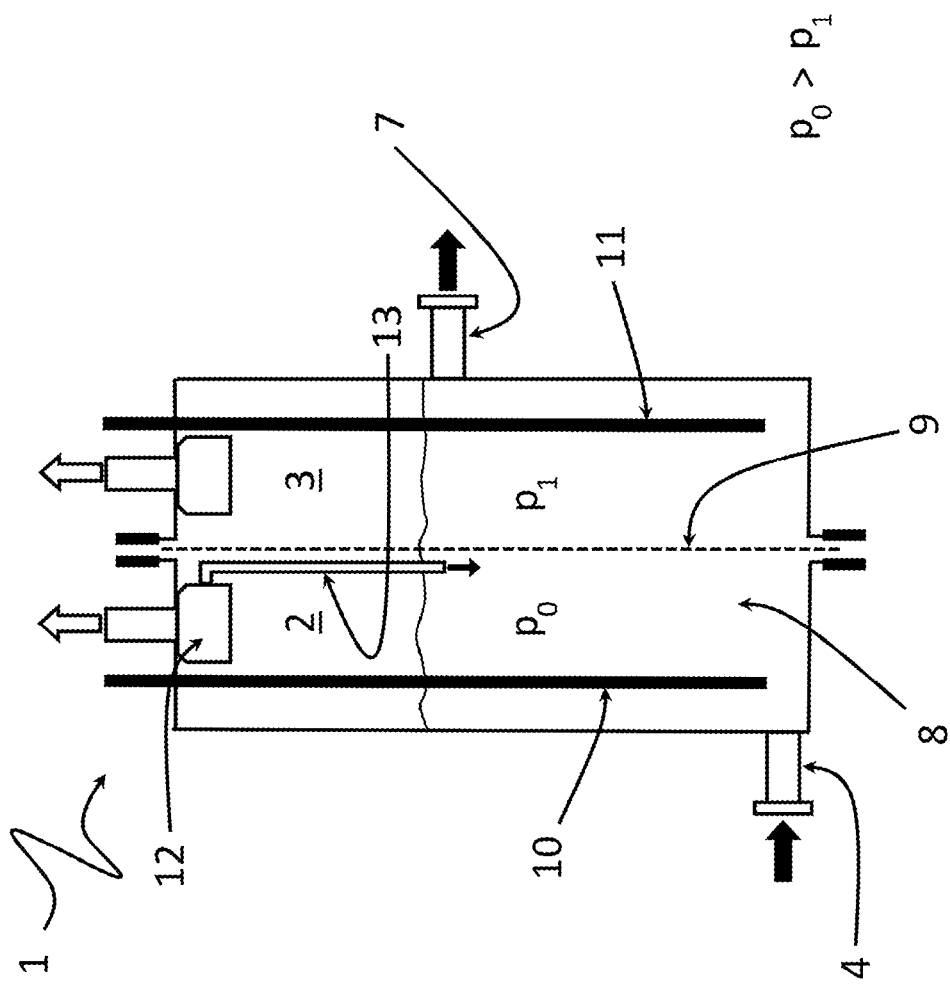
FIG. 3 is a schematic view of another example electrolytic cell with an internal return of the electrolyte recovered in the gas separator.

According to one development of the electrolytic cell 1 according to the invention that is depicted in FIG. 3, product gas and electrolyte 7 are separated in a gas separator 12 of the first half-cell 2, the recovered electrolyte 8 being returned to the electrolyte reservoir through an internal return line 13. In the context of the electrolytic cell according to the invention, the gas separator(s) can alternatively also be realized in a functional unit with the electrolyte outlet. Owing to the return of the electrolyte 8, electrolyte consumption can be significantly reduced, thereby also making it possible to reduce the operating costs. The advantage of the internal return lies in a compact, space-saving design.

Figure 4:
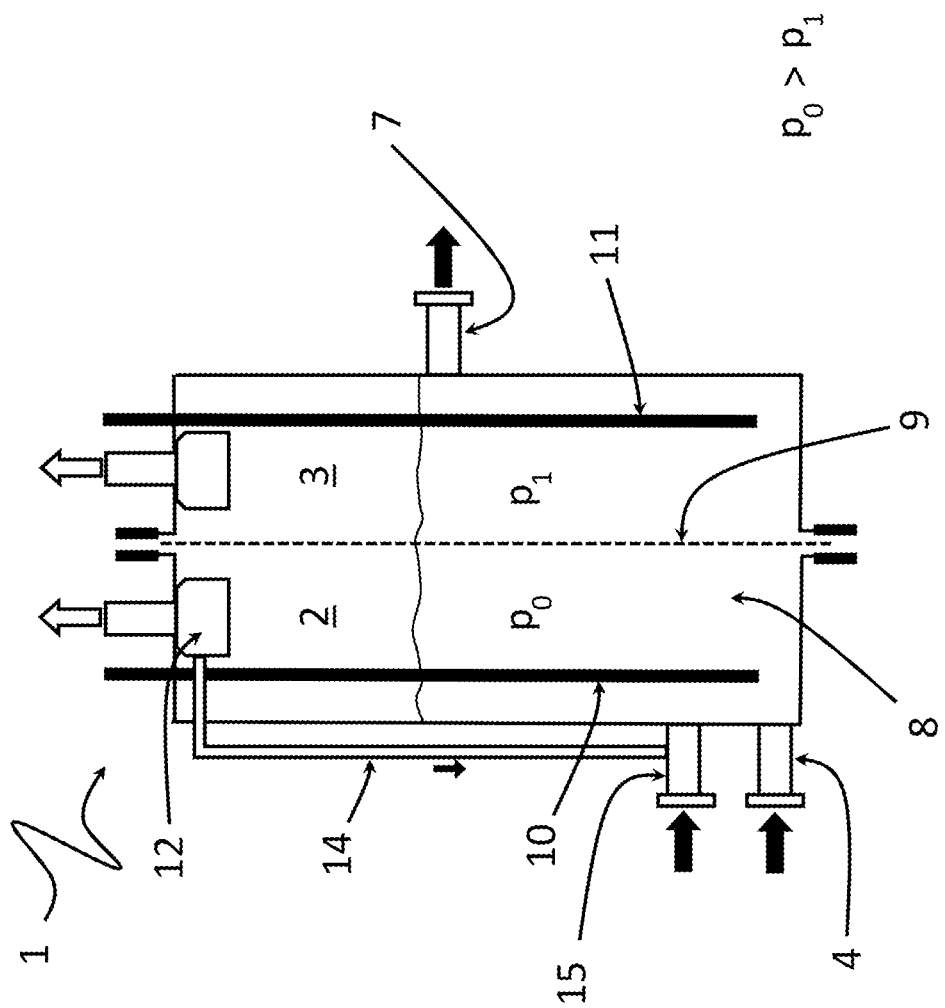
FIG. 4 is a schematic view of still another example electrolytic cell with an external return of the electrolyte recovered in the gas separator.

FIG. 4 shows one development of the electrolytic cell 1 according to the invention that is an alternative to FIG. 3, in which the return of the electrolyte 8 obtained in the gas separator 12 is realized as an external return with an external return line 14 and a second inlet 15. Such a return configuration does not impair the rise of product gas. Likewise, the return line 14 can be directly connected to the inlet 4, thereby limiting the number of necessary inlets to one.

Figure 5:
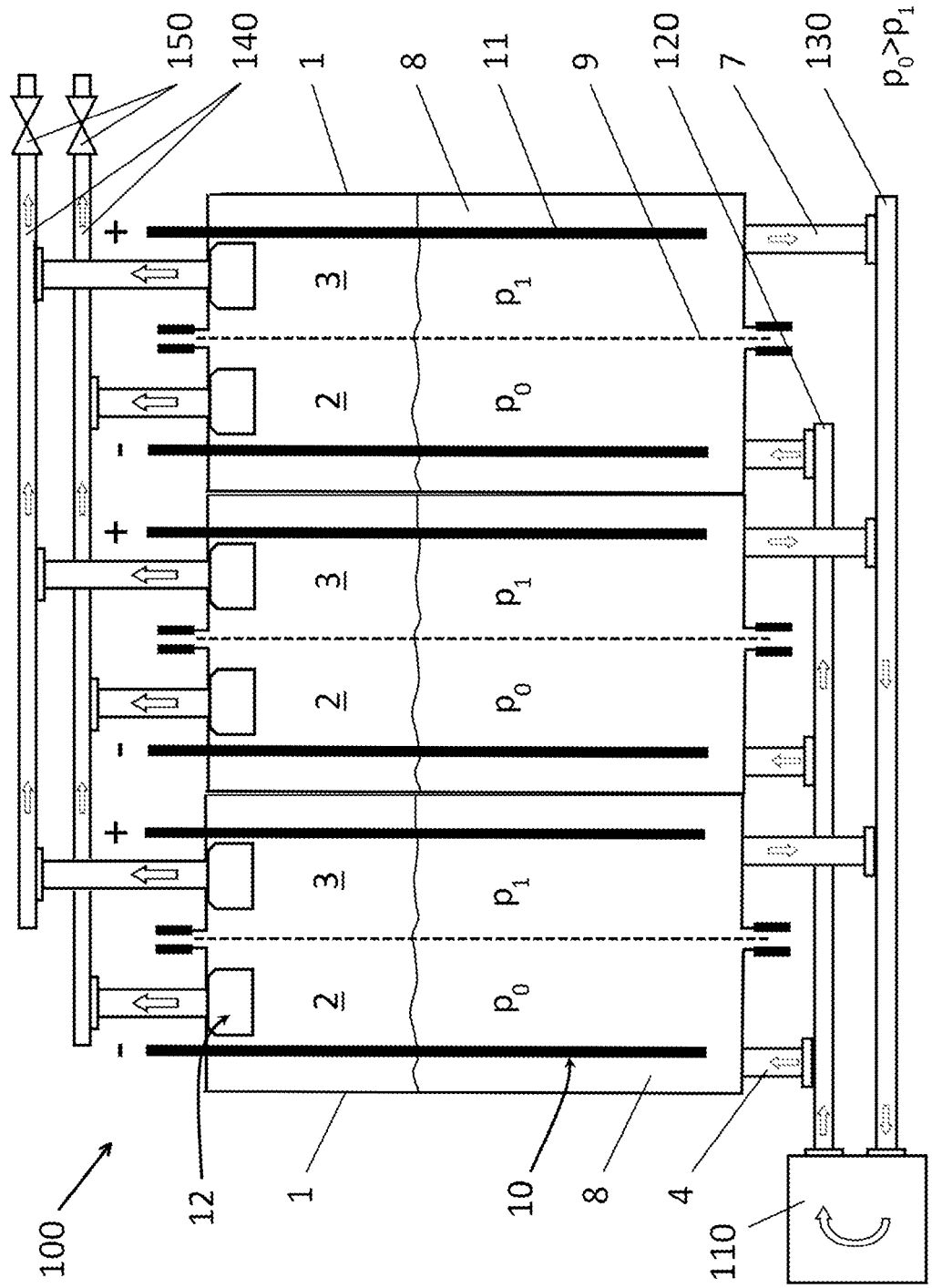
FIG. 5 is a schematic view of an example electrolyzer having a multiplicity of electrolytic cells that are hydraulically connected in parallel in an electrolyte circuit.

FIG. 5 shows an electrolyzer having a multiplicity of electrolytic cells 1 according to the exemplary embodiment in FIG. 2 that are hydraulically connected in parallel in an electrolyte circuit. The electrolytic cells 1 are electrically connected in series (not depicted).

The electrolyzer 100 depicted in FIG. 5 comprises only one electrolyte circuit for supplying electrolyte 8 to the cathode half-cells 2 and the anode half-cells 3. Electrolyte 8 is supplied to the anode half-cells 3 as a result of the electrolyte 8 passing through the separator 9. Particularly preferably, the electrolyte circuit is designed in such a way that the entire circulating electrolyte 8 is conducted through the separators 9 of the electrolyzer 100.

Starting from an electrolyte processing device 110, the electrolyte 8 is hydraulically supplied in parallel to the respective cathode half-cells 2 via an inflow distributor 120. Inside the electrolytic cells 1, the electrolyte 8 passes through the separator 9 to supply the anode half-cells 3 with electrolyte 8. The electrolyte 8 leaves the anode half-cells 3 via the outlet 7 and is returned to the electrolyte processing device 110 via a return collector 130.

The electrolyzer 100 further comprises means for generating a positive pressure 150, by means of which a positive pressure is appliable to the cathode half-cells 2 in relation to the anode half-cells 3. In the example shown in FIG. 5, the means for generating a positive pressure 150 are formed by adjustable pressure control valves in the gas discharge lines 140 for the product gases. As a result, it is possible for the pressures p0 and p1 in the cathode half-cells 2 and the anode half-cells 3, respectively, to be adjusted separately from one another in order to achieve a desired pressure drop. In principle, it is also possible to provide a pressure control valve only in the gas discharge line of the cathode half-cells 2 and to operate the anode half-cells 3 at ambient pressure. A pressure difference of less than 500 mbar is preferably set between the cathode half-cells 2 and the anode half-cells 3, particularly preferably less than 100 mbar.

The electrolytic cells 1 shown in FIG. 3 or 4 can also be connected together to form an electrolyzer in an analogous manner to FIG. 5. Therefore, all discussions relating to FIGS. 2 to 4 apply accordingly to the electrolytic cells 1 of the electrolyzer 100.

LIST OF REFERENCE SIGNS

1 Electrolytic cell
2 First half-cell

3 Second half-cell
4 Inlet for electrolyte
5 Inlet for electrolyte
6 Outlet for electrolyte
7 Outlet for electrolyte
8 Electrolyte
9 Separator
10 Electrode
11 Electrode
12 Gas separator
13 Internal return line for electrolyte
14 External return line for electrolyte
15 Inlet for electrolyte
100 Electrolyzer
110 Electrolyte processing device
120 Inflow distributor
130 Return collector
140 Gas discharge
150 Means for generating a positive pressure

What is claimed is:

1. An electrolytic cell comprising:
a cathode half-cell having a cathode;
an anode half-cell having an anode;
a separator that separates the two half-cells from one another and that is permeable to electrolyte present in the two half-cells during operation; and
a gas separator configured to separate a product gas from electrolyte in at least one of the two half-cells;
wherein a first half-cell of the two half-cells includes an inlet for electrolyte and
wherein a second half-cell of the two half-cells includes an outlet for the electrolyte and is free of any inlet for electrolyte such that electrolyte supplied via the inlet is dischargeable via the outlet after passing through the separator,
wherein the electrolytic cell is configured to perform alkaline water electrolysis,
wherein the cathode half-cell is the first half-cell that includes the inlet for electrolyte and the anode half-cell is the second half-cell that includes the outlet for electrolyte.

2. The electrolytic cell of claim 1, wherein the gas separator is connected to an electrolyte return that is configured to return electrolyte that has entered the gas separator to the respective half-cell.

3. The electrolytic cell of claim 2 wherein the electrolyte return is disposed inside the at least one of the two half-cells.

4. A method for operating the electrolytic cell of claim 1, the method comprising:
connecting the inlet and the outlet to an electrolyte circuit that is closed via the separator and filling the two half-cells with electrolyte;
starting an electrolysis process by closing an electrical circuit via the cathode and the anode of the electrolytic cell and an external power source;
discharging, during the electrolysis process, product gas formed in the two half-cells; and
applying to the first half-cell, during the electrolysis process, a positive pressure compared to the second half-cell to promote passage of electrolyte through the separator.

5. The method of claim 4 wherein the electrolytic cell comprises a gas separator configured to separate a product gas from electrolyte in at least one of the two half-cells, wherein the gas separator is connected to an electrolyte return that is configured to return electrolyte that has entered the gas separator to the respective half-cell, the method comprising returning electrolyte that has entered the gas separator to the respective half-cell.

6. An electrolyzer comprising electrolytic cells that are electrically connected in series and hydraulically connected in parallel in an electrolyte circuit, wherein each of the electrolytic cells is configured to perform alkaline water electrolysis and comprises:
a cathode half-cell having a cathode;
an anode half-cell having an anode; and
a separator that separates the two half-cells from one another and that is permeable to electrolyte present in the two half-cells during operation,
wherein a first half-cell of the two half-cells includes an inlet for electrolyte and
wherein a second half-cell of the two half-cells includes an outlet for the electrolyte and is free of any inlet for electrolyte such that electrolyte supplied via the inlet is dischargeable via the outlet after passing through the separator,
wherein the cathode half-cell is the first half-cell that includes the inlet for electrolyte and the anode half-cell is the second half-cell that includes the outlet for electrolyte.

7. The electrolyzer of claim 6 wherein the electrolyte circuit is the sole electrolyte circuit for supplying electrolyte to the cathode half-cells and the anode half-cells, wherein the electrolyzer and the separator are configured such that electrolyte is supplied to the anode half-cells through the separator.

8. The electrolyzer of claim 6 comprising means for generating a positive pressure by way of which a positive pressure is appliable to the cathode half-cells relative to the anode half-cells.

9. An electrolyzer comprising electrolytic cells that are electrically connected in series and hydraulically connected in parallel in an electrolyte circuit, wherein each of the electrolytic cells is configured to perform alkaline water electrolysis and comprises:
a cathode half-cell having a cathode;
an anode half-cell having an anode; and
a separator that separates the two half-cells from one another and that is permeable to electrolyte present in the two half-cells during operation,
wherein a first half-cell of the two half-cells includes an inlet for electrolyte and
wherein a second half-cell of the two half-cells includes an outlet for the electrolyte and is free of any inlet for electrolyte such that electrolyte supplied via the inlet is dischargeable via the outlet after passing through the separator,
wherein the cathode half-cell is the first half-cell that includes the inlet for electrolyte and the anode half-cell is the second half-cell that includes the outlet for electrolyte,
wherein the inlet and the outlet are connected to an electrolyte circuit that is closed via the separator.

10. The electrolyzer of claim 9 wherein the electrolyte circuit is the sole electrolyte circuit for supplying electrolyte to the cathode half-cells and the anode half-cells, wherein the electrolyzer and the separator are configured such that electrolyte is supplied to the anode half-cells through the separator.

11. The electrolyzer of claim 9 comprising means for generating a positive pressure by way of which a positive pressure is appliable to the cathode half-cells relative to the anode half-cells.

* * * * *